L. WHITE.
Potato Digger.
No. 21,226.
Patented Aug. 17, 1858.
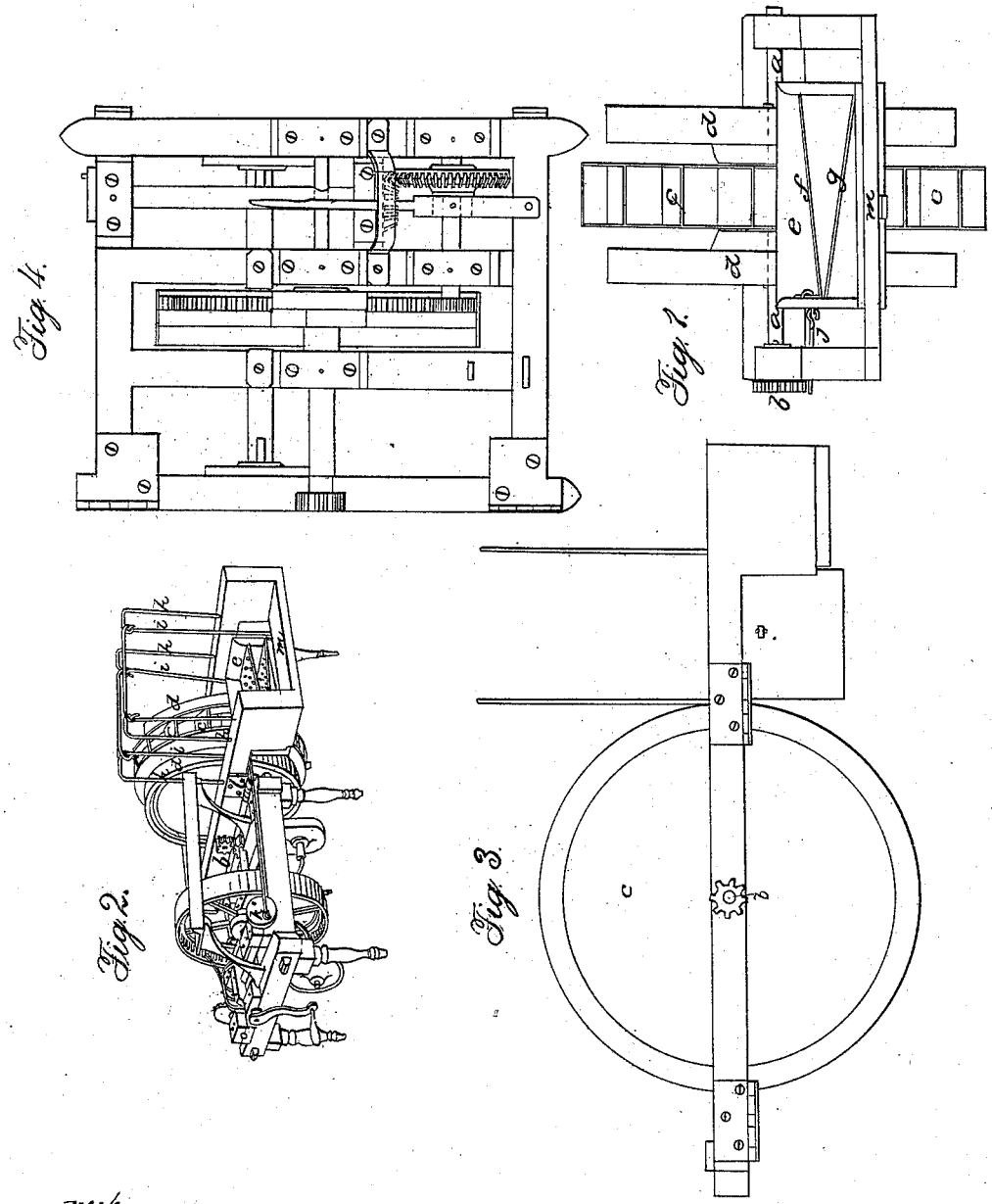
Witnesses
Inventor
Luke White ered by the motion of said cam in its revo-
UNITED STATES PATENT OFFICE.

LUKE WHITE, OF ESSEX, VERMONT.

IMPROVEMENT IN MACHINES FOR DIGGING POTATOES.

Specification forming part of Letters Patent No. 21,226, dated August 17, 1858.

*To all whom it may concern:*

Be it known that I, LUKE WHITE, of Essex, in the county of Chittenden and State of Vermont, have invented a new and Improved Machine for Digging Potatoes, Separating the Earth therefrom, and Assorting the Potatoes; and I do hereby declare that the following is a full and exact description thereof, reference being had to the accompanying drawings and the letters of reference marked thereon.

The nature of my invention consists in constructing a machine which may be operated by the hereinafter-described or any other well-known motive power, by which potatoes may be dug from the ground, the earth taken up with them, separated from them, and the potatoes assorted at the same time.

To enable others skilled in the art to make and use my invention, I will proceed to describe its construction and operation.

I construct a suitable oblong frame, through the side timbers of which I insert a shaft, as shown in Figure 1 of the accompanying drawings at points marked $a$ $a$, with a cog-wheel on the end of said shaft and outside of the side timber, as shown at points marked $b$ in Figs. 1, 2, and 3 of said drawings. I attach permanently to said shaft a wheel of proper dimensions, made of iron or other suitable material, with buckets, forks, or prongs on the outer edge of said wheel, as shown in Figs. 1 and 2 at points marked $c$ $c$, which wheel, when the machine is drawn forward, revolves upon said shaft in an opposite direction and digs the potatoes. On the same shaft I place two other wheels of smaller dimensions than the first-described wheel—viz., one on each side thereof—which revolve upon said shafts, as shown at points marked $d$ and gage wheel $c$, so that it enters the ground a proper depth only in digging potatoes.

I construct a separator in the form of a box, with three sides, (the other side being left open,) as shown in said Figs. 1 and 2 at points marked $e$. In this box I place two or more wire sieves, as shown in said Figs. 1 and 2 at points marked $f$ and $g$, through which the earth taken up by the wheel $c$ with the potatoes falls to the ground. Sieve $f$ is coarser than sieve $g$, and permits the smaller potatoes to fall through it onto the sieve $g$, the latter sieve being coarse enough to permit the very small potatoes to fall through it to the ground, and thus the potatoes are assorted in the process of separating the earth from them. I attach this separator to my machine by inserting iron rods into the frame of my machine in the rear of and near wheel $c$, extending said rods above and across said machine, as shown in said Fig. 2, wherein they are marked $h$. The separator is suspended to said rods by wires or rods attached thereto, with a hook, as shown at points marked $i$ in said Fig. 2. A rod is attached by a hook at one end thereof to said separator, as shown at point $j$ in said Fig. 1, and the other end of said rod is attached to a cam, as shown at point $k$ in Fig. 2, and when the machine is in motion this rod, operated by the motion of said cam in its revolutions, gives an alternating motion to said separator, which separates the potatoes from the earth mixed with them in digging them, and at the same time assorts the potatoes.

I attach my machine to its motive power on the side thereof by hinges, as shown in said Fig. 2 at point marked $l$, the cog-wheel $b$ fitting into a cog-wheel at the end of a shaft which carries the drive-wheel, and by the action of which cog-wheel, when the drive-wheel is in motion, my machine is operated.

When my machine is in operation wheel $c$ sinks into the ground and digs the potatoes, and they are carried over the wheel in the buckets and emptied into the separator, where they are separated from the earth mixed with them, and are assorted by the action of the separator above described, and fall from the sieves $f$ and $g$ into baskets attached to the platform at the foot of the sieves, which platform is shown and marked $m$ in Figs. 1 and 2.

Fig. 1 in said drawings represents an end view of my machine. Fig. 2 represents my machine attached to its motive power. The legs represented in said Fig. 2 form no part of the machine or motive power, but were attached as a matter of convenience to show the operation of the machine. Fig. 3 is a section of my machine, and shows the wheel marked $c$, which digs the potatoes, and also shows the cog-wheel $b$ on the end of the shaft, which passes through said wheel and to which said wheel is attached. Fig. 4 is a surface view of the motive power employed for operating my machine.

What I claim as my invention, and desire to secure by Letters Patent, is—

The combination of wheel $c$, having buckets on the outer edge thereof, with wheels $d$ and separator $e$, the whole being constructed and arranged as and for the purpose set forth.

LUKE WHITE.

Witnesses:
WM. WESTON,
JOSEPH W. ALLEN.